US012693383B2

(12) United States Patent
Haworth et al.

(10) Patent No.: US 12,693,383 B2
(45) Date of Patent: Jul. 28, 2026

(54) SYSTEMS AND METHODS FOR STATIC DETECTION BASED AMODALIZATION PLACEMENT

(71) Applicant: FORD GLOBAL TECHNOLOGIES, LLC, Dearborn, MI (US)

(72) Inventors: Andrew Haworth, Washington, DC (US); Xiufeng Song, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 18/053,621

(22) Filed: Nov. 8, 2022

(65) Prior Publication Data

US 2024/0151817 A1    May 9, 2024

(51) Int. Cl.
*G01S 7/48* (2006.01)
*B60W 50/00* (2006.01)
*G01S 17/50* (2006.01)

(52) U.S. Cl.
CPC ....... *G01S 7/4802* (2013.01); *B60W 50/0097* (2013.01); *G01S 17/50* (2013.01); *B60W 2420/408* (2024.01); *B60W 2520/14* (2013.01); *B60W 2554/20* (2020.02); *G06T 2207/10028* (2013.01); *G06T 2207/20072* (2013.01)

(58) Field of Classification Search
None
See application file for complete search history.

(56) References Cited

U.S. PATENT DOCUMENTS

| | | | |
|---|---|---|---|
| 11,180,162 B1 | 11/2021 | Player | |
| 11,557,129 B2 | 1/2023 | Chang et al. | |
| 2018/0253857 A1* | 9/2018 | Driegen | G06T 7/85 |
| 2019/0355171 A1 | 11/2019 | Ashley | |
| 2021/0024063 A1* | 1/2021 | Luo | B60W 30/095 |
| 2021/0403050 A1* | 12/2021 | Gan | B60W 60/0027 |
| 2022/0343101 A1* | 10/2022 | Chang | G01S 17/42 |
| 2023/0206653 A1* | 6/2023 | Sebastian | G01S 7/4802 |
| | | | 702/3 |

FOREIGN PATENT DOCUMENTS

WO    WO-2024215362 A2 * 10/2024    ............. G06T 7/593

* cited by examiner

*Primary Examiner* — Amandeep Saini
(74) *Attorney, Agent, or Firm* — Frank A. Mackenzie; Brooks Kushman P.C.

(57) ABSTRACT

Disclosed herein are systems, methods, and computer program products for controlling a mobile platform. The methods comprise: obtaining loose-fit cuboids overlaid on 3D graphs so as to each encompass lidar data points associated with an object; defining an amodal cuboid based on the loose-fit cuboids; checking whether or not the object is static through a time period; identifying a center for the amodal cuboid based on the checking; and causing operations of the mobile platform to be controlled based on the amodal cuboid having the center which was identified.

20 Claims, 11 Drawing Sheets

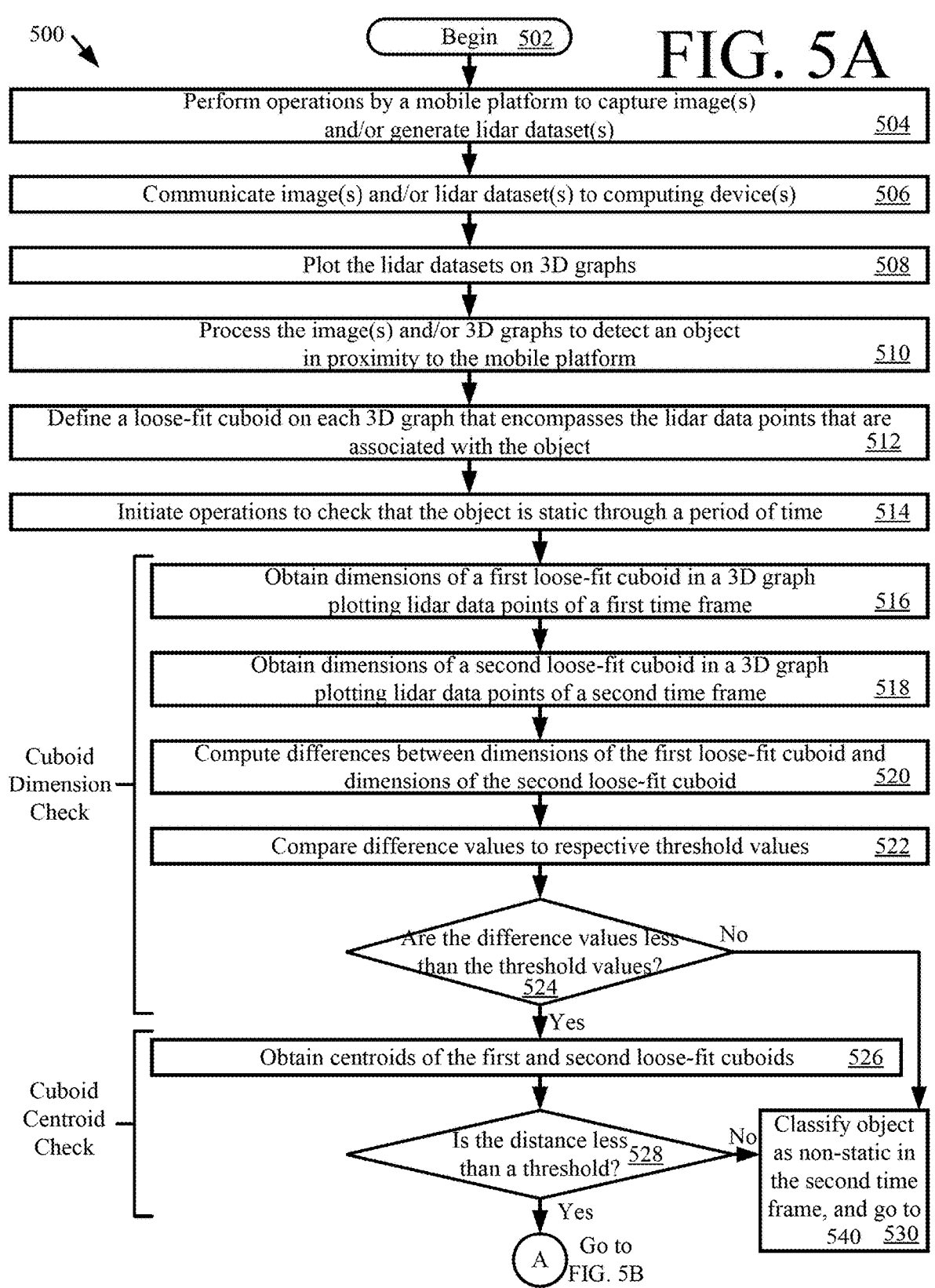

Begin  502

Perform operations by a mobile platform to capture image(s) and/or generate lidar dataset(s)          504

Communicate image(s) and/or lidar dataset(s) to computing device(s)          506

Plot the lidar datasets on 3D graphs          508

Process the image(s) and/or 3D graphs to detect an object in proximity to the mobile platform          510

Define a loose-fit cuboid on each 3D graph that encompasses the lidar data points that are associated with the object          512

Initiate operations to check that the object is static through a period of time          514

Cuboid Dimension Check

Obtain dimensions of a first loose-fit cuboid in a 3D graph plotting lidar data points of a first time frame          516

Obtain dimensions of a second loose-fit cuboid in a 3D graph plotting lidar data points of a second time frame          518

Compute differences between dimensions of the first loose-fit cuboid and dimensions of the second loose-fit cuboid          520

Compare difference values to respective threshold values          522

Are the difference values less than the threshold values? 524          No

Yes

Cuboid Centroid Check

Obtain centroids of the first and second loose-fit cuboids          526

Is the distance less than a threshold? 528          No

Classify object as non-static in the second time frame, and go to 540          530

Yes

A Go to FIG. 5B

From FIG. 5A

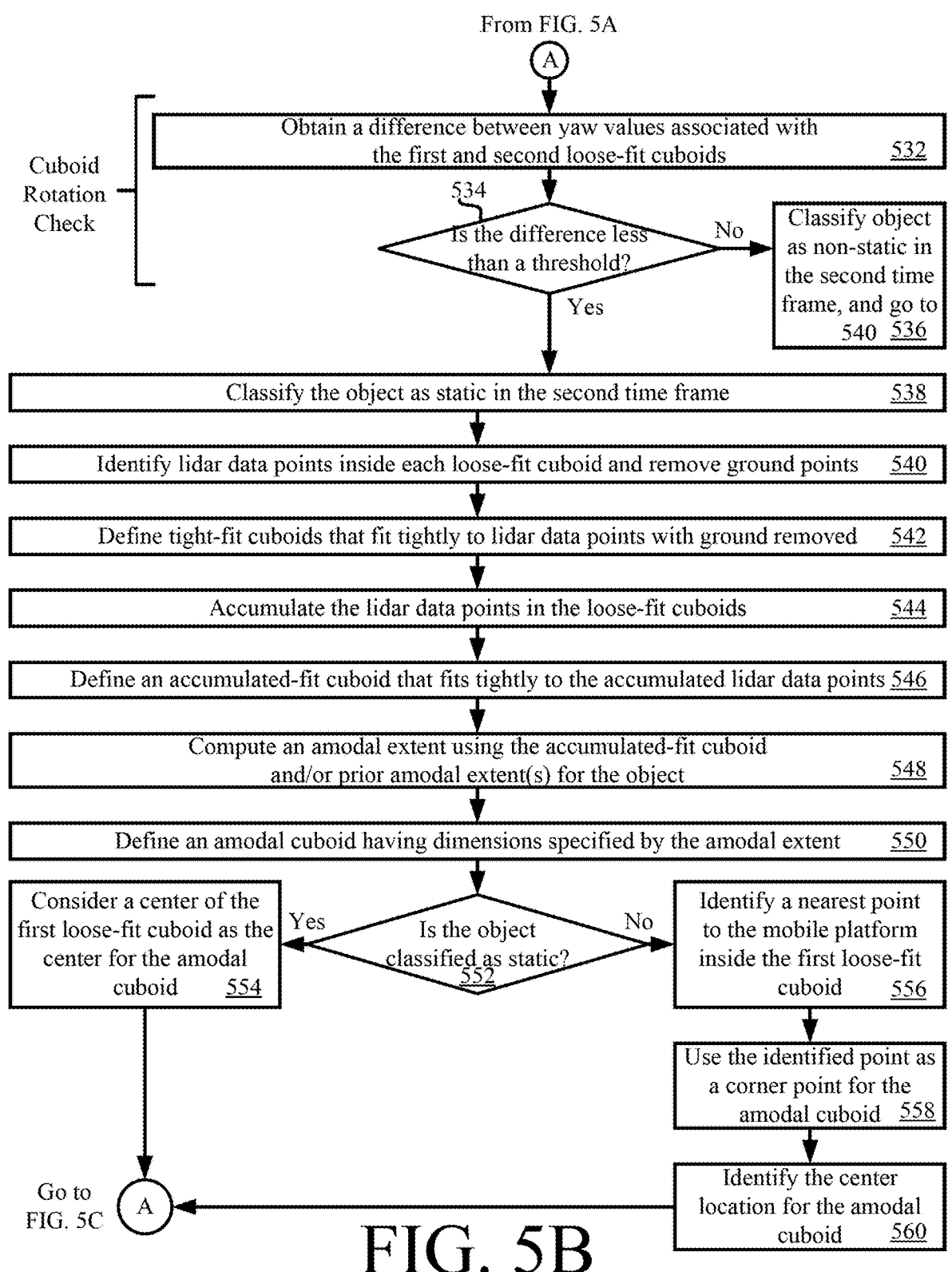

(A)

Cuboid
Rotation
Check

Obtain a difference between yaw values associated with
the first and second loose-fit cuboids                    532

534

Is the difference less
than a threshold?                    No → Classify object
as non-static in
the second time
frame, and go to
540    536

Yes

Classify the object as static in the second time frame                    538

Identify lidar data points inside each loose-fit cuboid and remove ground points    540

Define tight-fit cuboids that fit tightly to lidar data points with ground removed    542

Accumulate the lidar data points in the loose-fit cuboids                    544

Define an accumulated-fit cuboid that fits tightly to the accumulated lidar data points 546

Compute an amodal extent using the accumulated-fit cuboid
and/or prior amodal extent(s) for the object                    548

Define an amodal cuboid having dimensions specified by the amodal extent    550

Consider a center of the
first loose-fit cuboid as the
center for the amodal
cuboid    554

Yes ←          Is the object
classified as static?
552          → No

Identify a nearest point
to the mobile platform
inside the first loose-fit
cuboid    556

Use the identified point as
a corner point for the
amodal cuboid    558

Go to
FIG. 5C    (A) ←

Identify the center
location for the amodal
cuboid    560

FIG. 5B

From FIG. 5B

SYSTEMS AND METHODS FOR STATIC DETECTION BASED AMODALIZATION PLACEMENT

BACKGROUND

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the object's trajectory, and planning paths of travel for the vehicle based on the predicted objects trajectory.

SUMMARY

The present disclosure concerns implementing systems and methods for controlling a mobile platform (for example, an autonomous vehicle). The methods comprise performing the following operations by computing device(s): obtaining loose-fit cuboids overlaid on 3D graphs so as to each encompass lidar data points associated with an object; defining an amodal cuboid based on the loose-fit cuboids; checking whether or not the object is static through a time period; identifying a center for the amodal cuboid based on said checking; and causing operations of the mobile platform to be controlled based on the amodal cuboid having the center which was identified.

The implementing systems can comprise: a processor; and a non-transitory computer-readable storage medium comprising programming instructions that are configured to cause the processor to implement a method for controlling a mobile platform (for example, an autonomous vehicle). The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

FIGS. 5A-5C (collectively referred to as "FIG. 5") provides flow diagram of an illustrative method for operating a system in accordance with the present solution.

In the drawings, like reference numbers generally indicate identical or similar elements. Additionally, generally, the leftmost digit(s) of a reference number identifies the drawing in which the reference number first appears.

DETAILED DESCRIPTION

Figure 1:
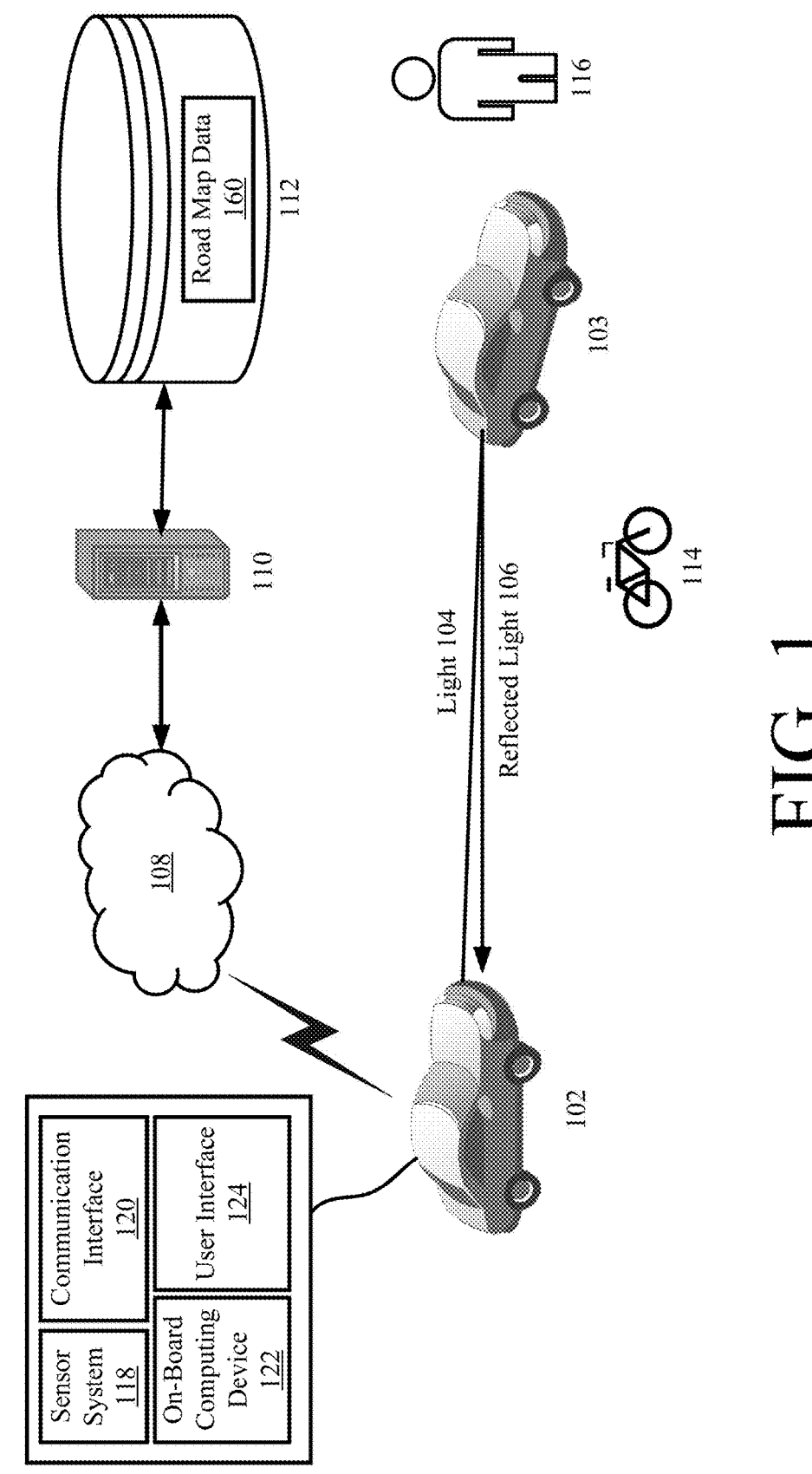
FIG. 1 provides an illustration of a system.

Real-time prediction of actions by drivers of other vehicles and pedestrians is a challenge for on-road semi-autonomous or autonomous vehicle applications. Such real-time prediction is particularly challenging when the drivers and/or pedestrians break traffic rules. Systematically assuming the worst case action from the drivers and/or pedestrians will paralyze the self-driving vehicle, but erroneously optimistic predictions can result in unsafe autonomous vehicle behavior.

Solutions to these issues involve using cuboid based algorithms for object detection. There are two types of cuboids, namely user labeled cuboids and true extent cuboids (or amodal cuboids). Amodalization is used to model the spatial extent of ground truth (GT) tracks. Current amodalization algorithms involve: pre-processing a point cloud to remove ground points and points that are too far from an AV and to ignore labels that have undefined extent (for example, steam and lidar bloom); extracting all points associated with an object that fall in a corresponding user labeled cuboid; repeating these operations for the duration of the object track lifetime; accumulating all points in the reference frame; creating an amodal cuboid that tightly contains the accumulated points; and placing the amodal cuboid back into the map frame at each time step to represent a tighter bound of the object throughout the track than the user labeled cuboid provides. The last operation requires finding the best location to center the amodal cuboid at each time step. Methods until now have used characteristics of the point cloud in relation to the AV in order to do this. However, this process can cause issues with stationary objects, especially if they are partially occluded. More specifically, the method used to place the cuboids back on the map causes lots of jumps in the location of the cuboids from one time step to the next, causing issues for downstream consumers of amodal cuboids. This document focuses on a process to remedy this cuboid jumping for static objects.

The present solution generally concerns systems and methods for controlling mobile platforms (such as vehicles) using a novel amodal cuboid based algorithm for static objects. The methods involve: obtaining loose-fit cuboids overlaid on 3D graphs so as to each encompass lidar data points associated with an object; defining an amodal cuboid based on the loose-fit cuboids; checking whether or not the object is static through a time period; identifying a center for the amodal cuboid based on the checking; and causing operations of the mobile platform to be controlled based on the amodal cuboid having the center which was identified. The center for the amodal cuboid may considered a center of one of the loose-fit cuboids when the object is static.

The check as to whether the object is static can involve performing a cuboid dimension check, a cuboid centroid check and/or a cuboid rotation check. The object may be classified as static in a time frame when the cuboid dimension check, the cuboid centroid check and the cuboid rotation check indicate that the object is associated with a same cuboid size, orientation and centroid at two consecutive times in the time period.

The cuboid dimension check may comprise: obtaining dimensions for a first loose-fit cuboid in a first one of the 3D graphs plotting lidar data points of a first time frame; obtaining dimensions for a second loose-fit cuboid in a second one of the 3D graphs plotting lidar data points of a second time frame; computing differences between dimensions of the first loose-fit cuboid and dimensions of the second loose-fit cuboid; and respectively comparing the differences to threshold dimension values. The object may be classified as non-static in the second time frame when one or more of the differences are greater than the threshold dimension values.

The cuboid centroid check may be performed when the differences are all less than the threshold dimension values. The cuboid centroid check may comprise: obtaining a distance between a centroid of the first loose-fit cuboid and a centroid of the second loose-fit cuboid; and comparing the distance to a threshold distance value. The object may be classified as non-static in the second time frame when the distance is greater than the threshold distance value.

The cuboid rotation check may be performed when the distance is less than the threshold distance value. The cuboid rotation check may comprise: obtaining a difference between yaw values associated with first and second loose-fit cuboids of the loose-fit cuboids; and comparing the difference to a threshold yaw difference value. The object may be classified as non-static in the second time frame associated when the difference is greater than the threshold yaw difference value.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 103, cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. Autonomous vehicle system may further include certain components (as illustrated, for example, in FIG. 1) included in vehicles, which may be controlled by the on-board computing device 122 using a variety of communication signals and/or commands, such as, for example, acceleration signals or commands, deceleration signals or commands, steering signals or commands, braking signals or commands, etc.

The sensor system 118 may include one or more sensors that are coupled to and/or are included within the AV 102. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 110 (for example, a cloud processing system) over communications network 108. Remote computing device 110 may be configured with one or more servers to perform one or more processes of the technology described in this document. Remote computing device 110 may also be configured to communicate data/instructions to/from AV 102 over network 108, to/from server(s) and/or datastore(s) 112. Datastore(s) 112 may include, but are not limited to, database(s).

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from datastore 112. Datastore 112 may be configured to store and supply raw data, indexed data, structured data, road map data 160, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface system 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

Figure 2:
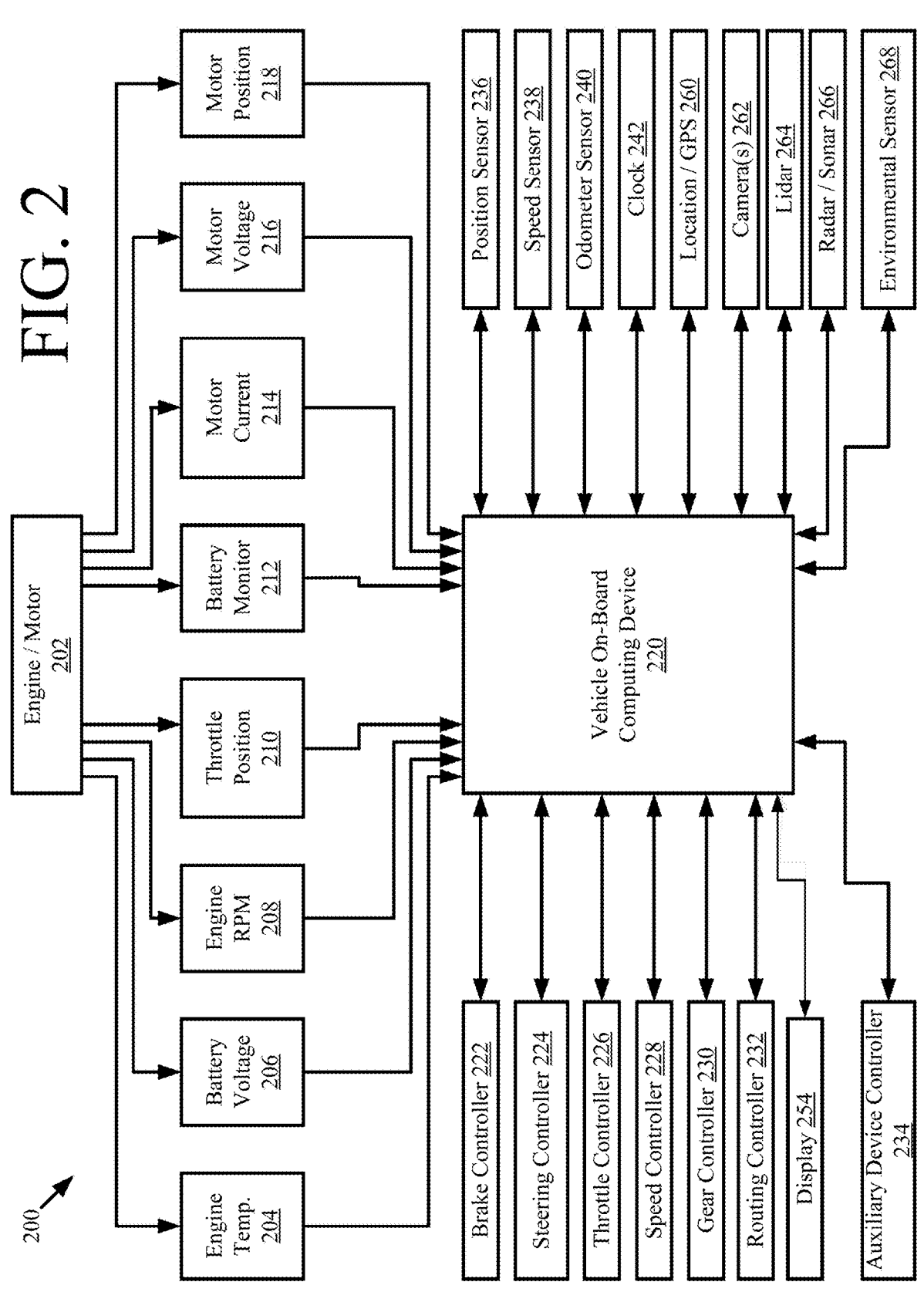
FIG. 2 provides a more detailed illustration of an autonomous vehicle.

FIG. 2 illustrates an example system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described in this document and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 for a vehicle includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine revolutions per minute (RPM) sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 260 (such as a Global Positioning System (GPS) device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 9. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 234 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the vehicle on-board computing device 920. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 254 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In various embodiments, the vehicle on-board computing device 220 may determine perception information of the surrounding environment of the AV. Based on the sensor data provided by one or more sensors and location information that is obtained, the vehicle on-board computing device 220 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 220 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 220 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 220 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In various embodiments, the vehicle on-board computing device 220 may determine a motion plan for the autonomous vehicle. For example, the vehicle on-board computing device 920 may determine a motion plan for the autonomous vehicle based on the perception data and/or the prediction data. Specifically, given predictions about the future locations of proximate objects and other perception data, the vehicle on-board computing device 220 can determine a motion plan for the AV that best navigates the autonomous vehicle relative to the objects at their future locations.

In some embodiments, the vehicle on-board computing device 220 may receive predictions and make a decision regarding how to handle objects and/or actors in the environment of the AV. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the AV to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the autonomous vehicle is generated for execution. The vehicle on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
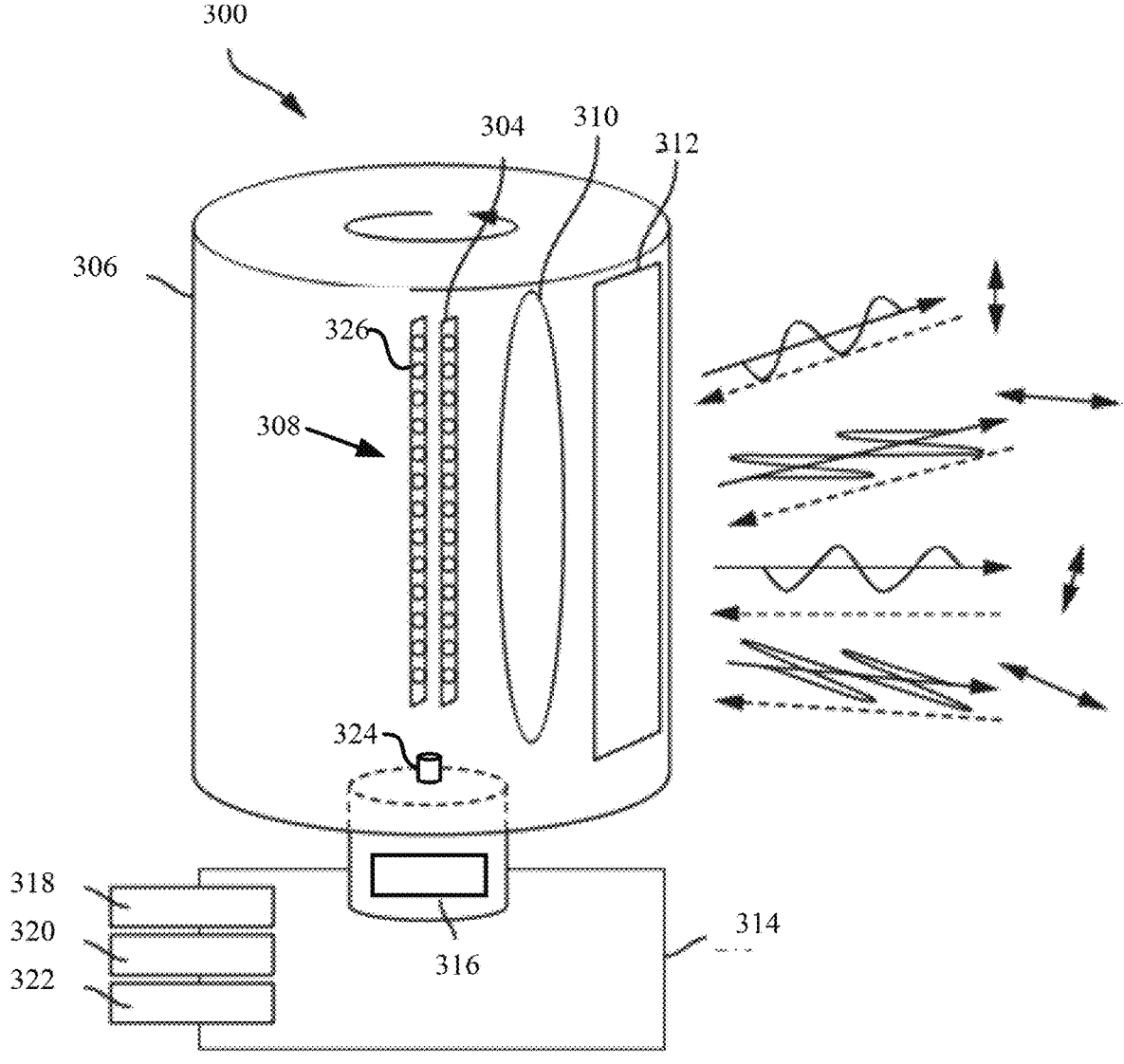
FIG. 3 is an illustration of a lidar system.

FIG. 3 illustrates an architecture for a lidar system 300, in accordance with aspects of the disclosure. Lidar system 300 is merely an example lidar system and that other lidar systems are further contemplated in accordance with aspects of the present disclosure, as should be understood by those of ordinary skill in the art.

As shown in FIG. 3, the lidar system 300 includes a housing 306 which may be rotatable 360° about a central axis such as hub or axle 324 of a motor 316. The housing 306 may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the apertures 312 and receive reflected light back toward one or more of the apertures 312 as the housing 306 rotates around the internal components. In alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (for example, 8 emitters, 64 emitters, or 128 emitters). The emitters may emit light of substantially the same intensity or of varying intensities. The lidar system 300 also includes a light detector 308 containing an array of photodetectors 326. The photodetectors 326 are positioned and configured to receive light reflected back into the system. Upon receiving reflected light, the photodetectors 326 produce results (or electrical pulses) indicating measured intensities of the light signal reflected off an object external to the lidar system. In Geiger mode applications, the photodetectors 326 fire when a single photon at or near a target wavelength is detected thereby. The times of the photodetector firings are recorded as timestamps. The light emitter system 304 and light detector 308 rotate with the rotating shell, or they rotate inside the stationary dome of the housing 306. One or more optical element structures 310 may be positioned in front of the light emitting system 304 and/or the light detector 308 to serve as one or more lenses or wave plates that focus and direct light that is passed through the optical element structure 310.

One or more optical element structures 310 may be positioned in front of a mirror (not shown) to focus and direct light that is passed through the optical element structure. As shown in FIG. 3, a single optical element structure 310 is positioned in front of the mirror and connected to the rotating elements of the system so that the optical element structure 310 rotates with the mirror. Alternatively or additionally, the optical element structure 310 may include multiple such structures (for example, lenses and/or waveplates). Optionally, multiple optical element structures 310 may be arranged in an array on or integral with the shell portion of the housing 306.

The lidar system 300 includes a power unit 318 to power the light emitting system 304, motor 316, and electronic components. The lidar system 300 also includes an analyzer 314 with elements such as a processor 322 and non-transitory computer-readable memory 320 containing programming instructions. The programming instructions are configured to enable the system to receive data collected by the light detector 308, analyze the received data to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
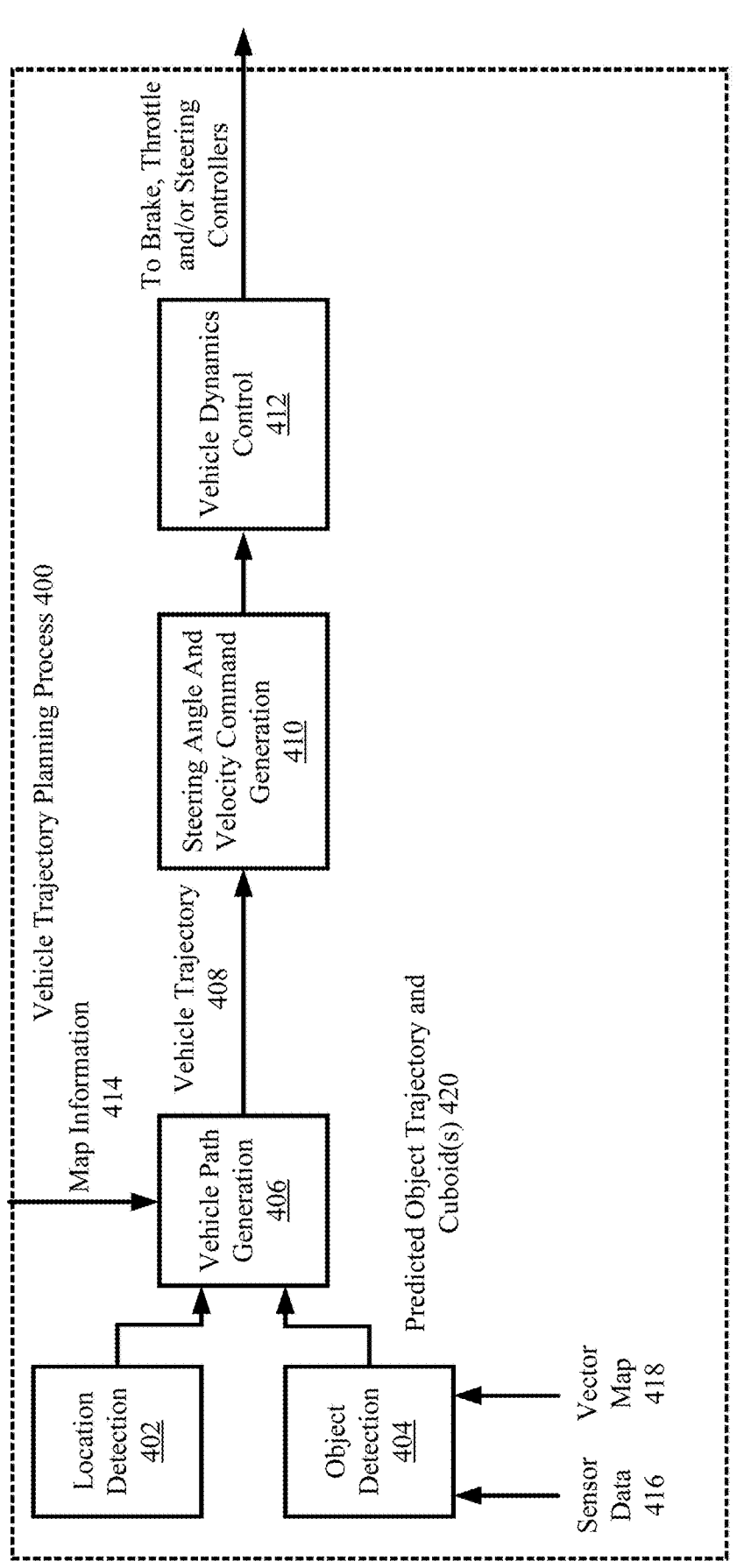
FIG. 4 provides a block diagram of an illustrative vehicle trajectory planning process.

FIG. 4 provides a block diagram that is useful for understanding how motion or movement of an AV is achieved in accordance with the present solution. All of the operations performed in blocks 402-412 can be performed by the on-board computing device (for example, on-board computing device 122 of FIGS. 1 and/or 220 of FIG. 2) of a vehicle (for example, AV 102 of FIG. 1).

In block 402, a location of the AV (for example, AV 102 of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 406.

In block 404, an object (for example, vehicle 103 of FIG. 1) is detected within proximity of the AV (for example, <100+ meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 404 for the object. The object's trajectory is predicted in block 404 based on the object's class, cuboid geometry(ies), cuboid heading(s) and/or contents of a map 418 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 418 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 420 specifying the object's predicted trajectory, the cuboid geometry(ies)/heading(s) is provided to block 406. In some scenarios, a classification of the object is also passed to block 406. In block 406, a vehicle trajectory is generated using the information from blocks 402 and 404. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 408 can be determined based on the location information from block 402, the object detection information from block 404, and/or map information 414 (which is pre-stored in a data store of the vehicle). The map information 414 may include, but is not limited to, all or a portion of road map(s) 160 of FIG. 1. The vehicle trajectory 408 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 408 is then provided to block 406.

In block 410, a steering angle and velocity command is generated based on the vehicle trajectory 408. The steering angle and velocity command are provided to block 410 for vehicle dynamics control, i.e., the steering angle and velocity command causes the AV to follow the vehicle trajectory 408.

FIG. 5 provides a flow diagram of an illustrative method 500 for controlling an AV (for example, vehicle 1021 of FIG. 1) using an amodal cuboid based algorithm. Method 500 can be entirely or partially performed by a computing device of the AV (for example, a vehicle's on-board computing device 122 of FIGS. 1 and/or 220 of FIG. 2) and/or an external computing device (for example, server 110 of FIG. 1). Operations of method 500 can be performed in the same or different order than that shown in FIG. 5. For example, in some scenarios, operations of blocks 540-550 can be performed prior to operations of blocks 514-538 rather than after as shown in FIG. 5.

As shown in FIG. 5A, method 500 begins with 502 and continues with 504 where a mobile platform (for example, AV 102 of FIG. 1) performs operations to capture at least one image and/or generate at least one LiDAR dataset. The image(s) and/or LiDAR dataset(s) is(are) communicated in 506 to one or more computing devices (for example, computing device 110 of FIG. 1 and/or on-board computing device 122 of FIGS. 1 and/or 220 of FIG. 2).

At the computing device(s), the LiDAR dataset(s) is(are) plotted on 3D graph(s) as shown by 508. Each 3D graph has an x-axis, a y-axis and a z-axis with an origin defined at a center of a LiDAR sensor, the x-axis pointing forward and the z-axis pointing upward. An illustration of a LiDAR dataset 602 plotted on a graph 600 is provided in FIG. 6. Graph 600 only shows the 2D point of view from the x-axis and the z-axis for ease of illustration. Any known or to be known techniques for plotting LiDAR datasets on 3D graphs can be used here.

The image(s) and/or 3D graph(s) are used in 510 to detect an object that is located in proximity to the AV. This detection can be made manually by an individual or automatically/automatedly by the computing device. In the manual scenarios, the individual analyzes the 3D graphs displayed on a screen of the computing device to identify data points that appear to define an object. In the automatic/automated scenarios, the computing device can employ any known or to be known algorithm to identify data points that appear to define an object. Machine learning algorithms can be used here to facilitate the object detection(s) and/or classification(s).

A loose-fit cuboid is defined in 512 on each 3D graph. The loose-fit cuboid comprises a 3D oriented bounded box that represents (i) a heading of the object (for example, object 103, 114 or 116 of FIG. 1), (ii) the full extent of the object (for example, object 103, 114 or 116 of FIG. 1), and/or the center/centroid of the object. The cuboid encompasses the LiDAR data points in the 3D graph that are associated with the detected object. The loose-fit cuboid can be defined manually or automatically/automatedly. In the manual scenarios, the individual may perform user-software interactions to draw a cuboid shape around the LiDAR data points identified in 510 with a heading direction defined by the orientation of the object. In the automatic/automated scenarios, the computing device may obtain pre-defined cuboid dimensions (a length, a width, a height) and set a center of a cuboid equal to a center of the LiDAR data points identified in 510. A loose-fit cuboid can comprise a 3D shape that (i) encompasses a given percentage (for example, >90%) of the LiDAR data points of an object and (ii) none or a minimal number of the LiDAR data points for other objects (but allowing for the inclusion of LiDAR data points for ground surface).

Figure 6:
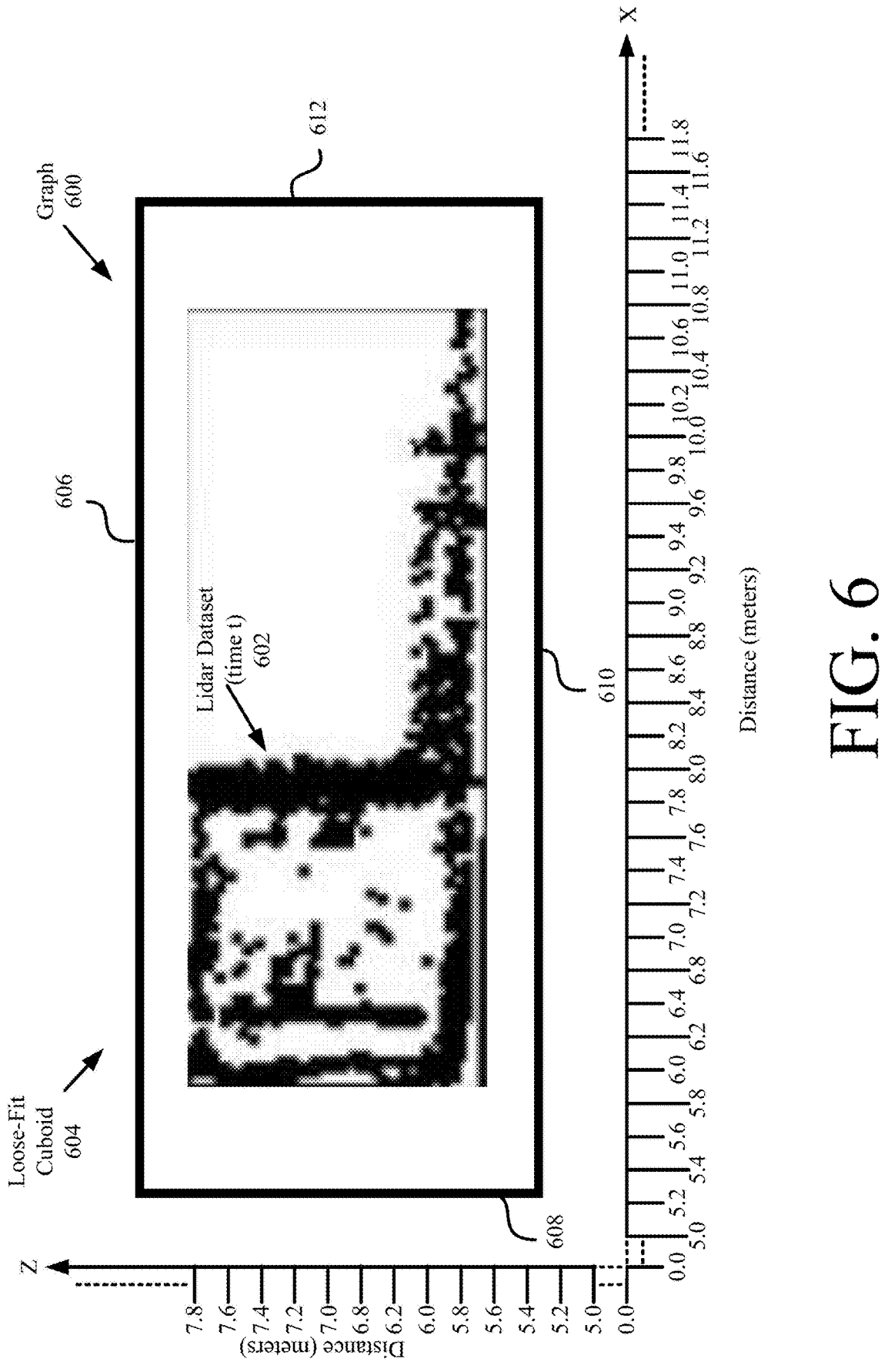
FIG. 6 shows a graph plotting lidar data points that are encompassed by a loose-fit cuboid.

An illustration showing an illustrative loose-fit cuboid 604 defined on a graph 600 is provided in FIG. 6. As shown in FIG. 6, data points of a LiDAR dataset 602 reside within the cuboid 604. None of the edges 606, 608, 610, 612 of the cuboid touch or otherwise are in contact with the data points of the LiDAR dataset 602. The present solution is not limited to the particulars of this illustration. One or more of the cuboid edges may touch or otherwise be in contact with data points of the LiDAR dataset. The loose-fit cuboid is constructed in accordance with known or to be known techniques. For example, the cuboid is constructed by: fusing the LiDAR dataset, a vector map and a visual heading; and defining a cuboid along the visual heading with a highest likelihood. The vector map contains the lane direction which provides a strong indication for a heading of the loose-fit cuboid. The visual heading is estimated for the object from the camera images. The present solution is not limited to the particulars of this example.

In 514, operations are initiated or otherwise enabled for checking whether or not the object is static through a period of time $T_1, \ldots, T_n$. These check operations use the loose-fit cuboids. The loose-fit cuboid has a centroid, orientation, width, length and height. Given the contiguous frames, the system checks whether the object's representation violates a threshold in a map reference frame. This check can be generally defined by mathematical equation (1).

$$|x_t - x_{t+1}| \leq \tau_x \qquad (1)$$

where x represents a check on a certain quantity (for example, centroid location, length, width or height), while $\tau_x$ represents the corresponding threshold. A static declaration requires all checks across all neighbor frames to be within the threshold.

In some scenarios, the following three checks are performed by the system: a cuboid dimension check, a centroid check and a cuboid rotation check. These checks are performed for each pair of loose-fit cuboids encompassing lidar data acquired during the period of time $T_1, \ldots, T_n$. Thus, the set of three checks may be iteratively performed when more than two loose-fit cuboids are under consideration in the period of time $T_1, \ldots, T_n$. For example, a first iteration considers first and second loose-fit cuboids, while a second iteration considers second and third loose-fit cuboids, and so on.

The cuboid dimension check includes the operations of blocks 516-524. These operations involve: obtaining dimensions (for example, length, width and height) of a first loose-fit cuboid (for example, $Cuboid_{Tk}$) in a 3D graph plotting lidar data points of a first time frame (for example, time frame $T_k$); obtaining dimensions of a second loose-fit cuboid (for example, $Cuboid_{Tk+1}$) in a 3D graph plotting lidar data points of a second time frame (for example, time frame $T_{k+1}$); and computing differences between dimensions of the first loose-fit cuboid and dimensions of the second loose-fit cuboid. These computations may be defined by the following mathematical equation (2)-(4).

$$L_{Diff} = L_{CuboidTk} - L_{CuboidTk+1} \qquad (2)$$

$$W_{Diff} = W_{CuboidTk} - W_{CuboidTk+1} \qquad (3)$$

$$H_{Diff} = H_{CuboidTk} - H_{CuboidTk+1} \qquad (4)$$

where $L_{Diff}$ represents a difference in length between two cuboids, $L_{CuboidTk}$ represents a length of the first loose-fit cuboid, $L_{CuboidTk+1}$ represents a length of the second loose-fit cuboid, $W_{Diff}$ represents a difference in width between two cuboids, $W_{CuboidTk}$ represents a width of the first loose-fit cuboid, $W_{CuboidTk+1}$ represents a width of the second loose-fit cuboid, $H_{Diff}$ represents a difference in height between two cuboids, $H_{CuboidTk}$ represents a height of the first loose-fit cuboid, and $H_{CuboidTk+1}$ represents a height of the second loose-fit cuboid. Next, the difference values are respectively compared to threshold values as shown by mathematical equations (5)-(7).

$$L_{Diff} < L_{Threshold} \tag{5}$$

$$W_{Diff} < W_{Threshold} \tag{6}$$

$$H_{Diff} < H_{Threshold} \tag{7}$$

where $L_{Threshold}$ represents a threshold length, $W_{Threshold}$ represents a threshold width, and $H_{Threshold}$ represents a height threshold.

If one or more of the differences are respectively equal to or greater than the threshold values [524:NO], then method 500 continues to 530 which will be discussed below. In contrast, if the differences are all less than their respective threshold values [524:YES], then method 500 continues with the cuboid centroid check. It is important to compare not only the sizes of the first and second loose-fit cuboids, but their locations in the map reference frames as well. As the AV is possibly moving, the loose-fit cuboids from time $T_k$ and $T_{k-1}$ are placed back to the map reference frame (rather than the vehicle reference frame). Then, the system checks whether the centroids of the loose-fit cuboids are within a distance threshold of each other.

Accordingly, the cuboid centroid check includes the operations of blocks 526-530. In some scenarios, The operations involve: obtaining centroids $C_{CuboidTk}$, $C_{CuboidTk+1}$ of the first and second loose-fit cuboids; and determining a distance $D_{centroids}$ between the same. This distance may be defined by the following mathematical equation (8).

$$D_{centroids} = C_{CuboidTk} - C_{CuboidTk+1} \tag{8}$$

The distance is then compared to a threshold distance value $D_{threshold}$ as shown by mathematical equation (9).

$$D_{centroids} < D_{threshold} \tag{9}$$

When the distance is equal to or greater than the threshold value [528:NO], the operations of block 530 are performed to classify or otherwise consider the object as non-static in the second time frame Tk+1. Method 500 then continues to block 540 of FIG. 5B which will be discussed below. When the distance is less than the threshold value [528:YES], method 500 continues with the cuboid rotation check.

As shown in FIG. 5B, the cuboid rotation check involves the following operations of block 532-536: obtain yaw values $Yaw_{CuboidTk}$, $Yaw_{CuboidTk+1}$ associated with the first and second loose fit-cuboids; determining a difference between the yaw values; and comparing the difference value to a threshold value $Yaw_{threshold}$. These operations are defined by the following mathematical equation (10).

$$|Yaw_{CuboidTk} - Yaw_{CuboidTk+1}| < Yaw_{threshold} \tag{10}$$

The yaw is the rotation of the cuboid around a vertical axis and are used here to evaluate if the two loose-fit cuboids have the same rotation. If the difference value is equal to or greater than the threshold value [534:NO], then method 500 continues with 536 where the object is classified as a non-static object in the second time frame Tk+1. Method 500 then continues with 540 which will be discussed below. If the difference value is less than the threshold value [534:YES], then the object is classified as a static object in the second time frame Tk+1, as shown by block 538.

Next in 540, the system identifies lidar data points inside each loose-fit cuboid. The identified lidar points are processed to remove or otherwise filter ground points therefrom. The ground points can be identified using content of a road/terrain map, a known sensor height, and/or a plane fitting algorithm. The remaining lidar data points associated with each loose-fit cuboid are referred to as a set of lidar data points.

In 542, a tight-fit cuboid is defined that tightly fits each set of lidar data points. Each tight-fit cuboid is defined by: transforming the coordinates of the loose-fit cuboid from a first coordinate system to a second different coordinate system; and adjusting the xyz coordinates of the cuboid corners to have minimal values for encompassing a given number of lidar data points for the object (with a tolerance for outlier lidar data points). The first coordinate system may comprise a lidar system/sensor coordinate system, i.e., an xyz coordinate system having an origin of the three axes at a center of a lidar system/sensor center. The second coordinate system may comprise an xyz coordinate system having an origin of the three axes at a center of an object, the x-axis pointing forward (i.e., towards the heading of the object), and the z-axis pointing upward.

In some scenarios, the tight-fit cuboid is defined by adjusting the coordinate values for each face based on the coordinates of a lidar data point with a smallest x-axis value in the lidar data points for the object, a lidar data point with a smallest y-axis (or y-coordinate) value in the lidar data points for the object, a lidar data point with a smallest z-axis (or z-coordinate) value in the lidar data points for the object, a lidar data point with a largest x-axis (or x-coordinate) value in the lidar data points for the object, a lidar data point with a largest y-axis value in the lidar data points for the object, and a lidar data point with a largest z-axis value in the lidar data points for the object. For example, geometry coordinates for the tight-fit cuboid are selected so that the listed lidar data points are contained therein. Tolerance thresholds may need to be met. For example, ninety-five percent (95%) of all lidar data points for the object need to be included in the tight-fit cuboid. The present solution is not limited to the particulars of these examples.

Figure 7:
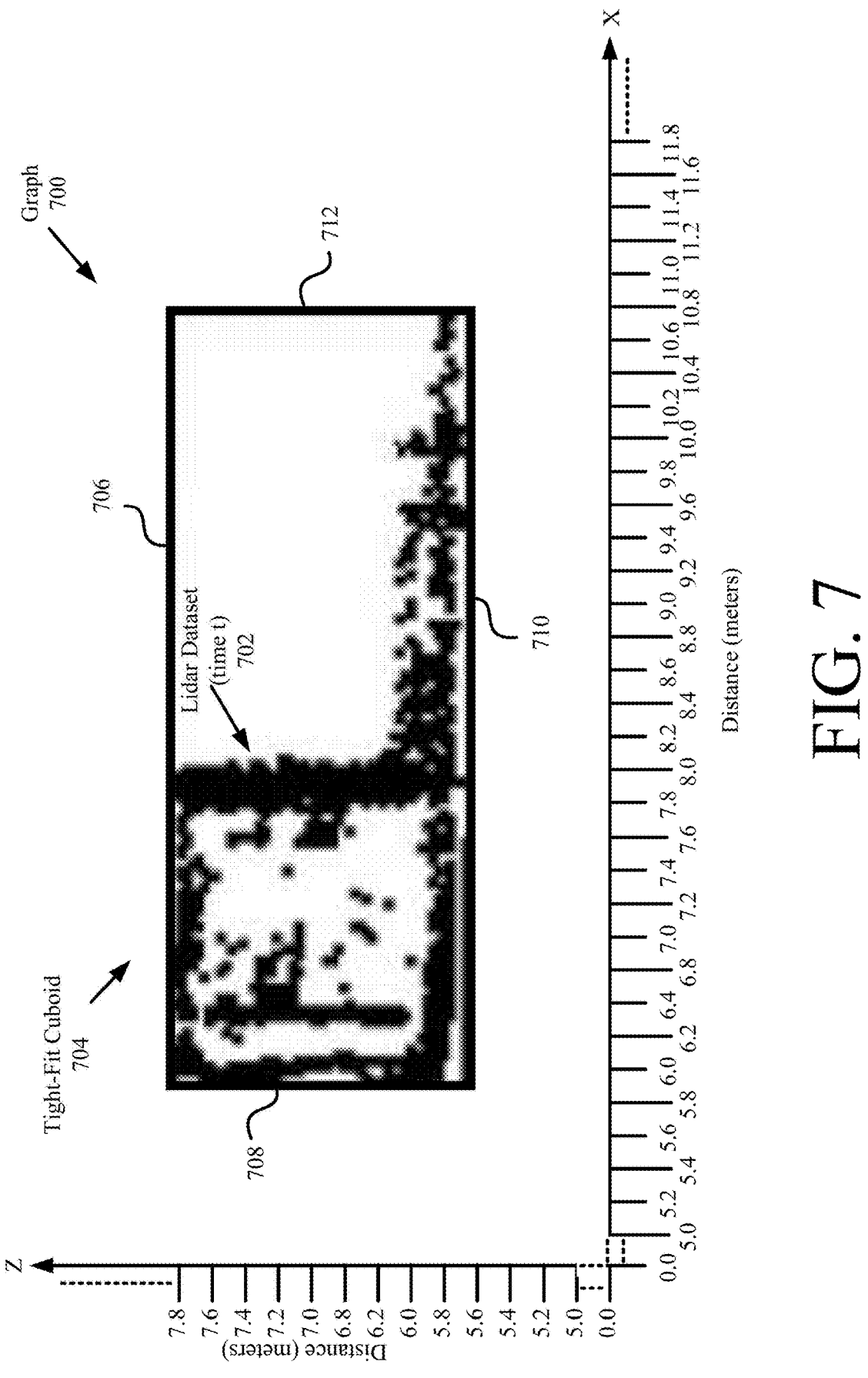
FIG. 7 shows a graph plotting lidar data points that are encompassed by a tight-fit cuboid.

An illustration of a tight-fit cuboid 704 plotted on a graph 700 is provided in FIG. 7. As shown in FIG. 7, data points of a lidar dataset 702 reside within the cuboid 704. The lidar dataset 702 can comprise lidar dataset 602 of FIG. 6 with data points for ground removed therefrom. Edges 706, 708, 710, 712 of the cuboid touch or otherwise are in contact with the data points of the lidar dataset 702. The present solution is not limited to the particulars of this illustration. For example, one or more data points of the lidar dataset may reside outside of the tight-fit cuboid 704 in accordance with tolerance thresholds.

Figure 8:
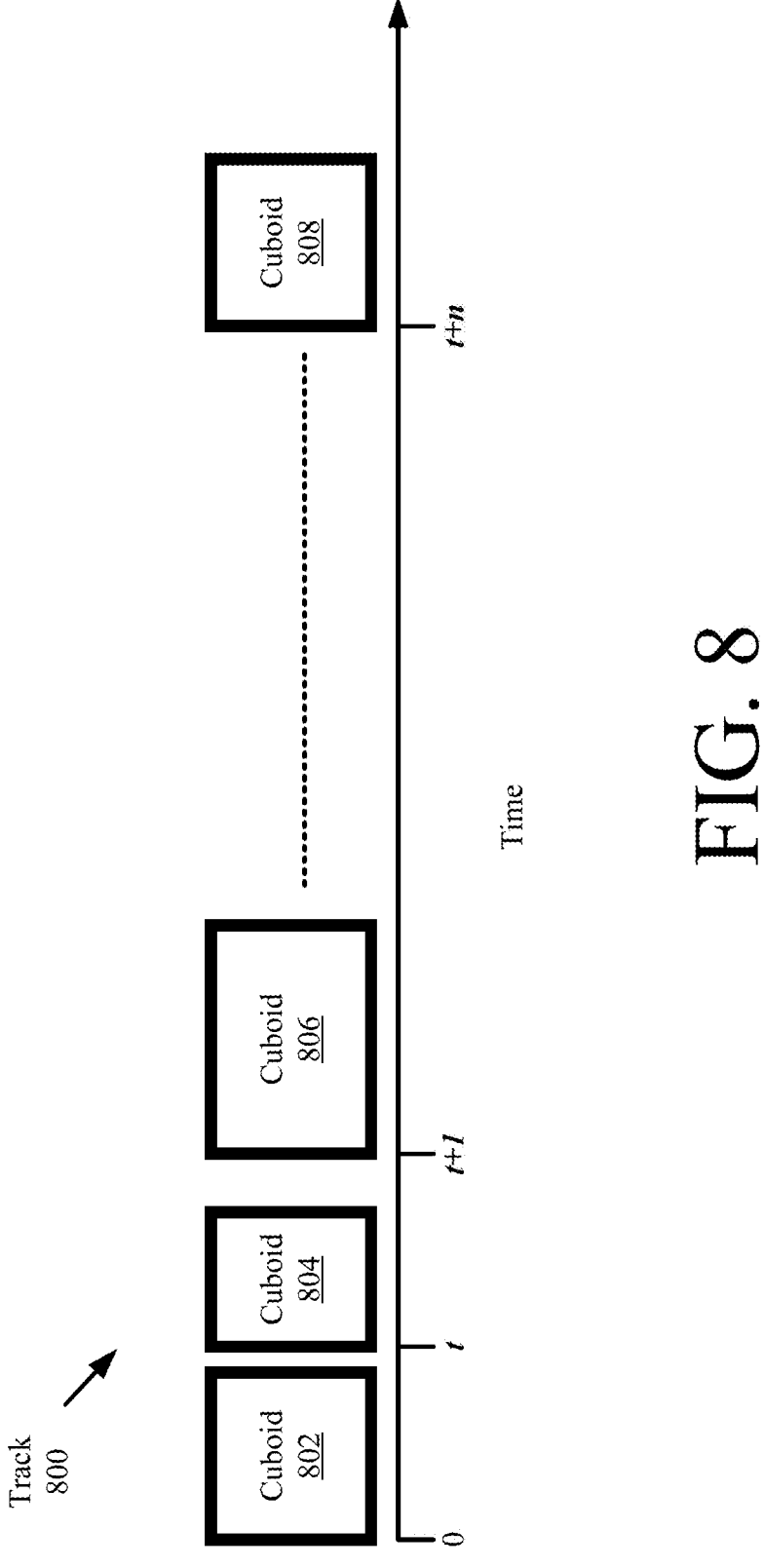
FIG. 8 provides an illustration that is useful for understanding a track.

Next in 544, the lidar data points in the loose-fit cuboids of a track are transformed into a second coordinate system and then accumulated into a single 3D graph. For example, the lidar data points of loose-fit cuboids 802, 804, 806, 808 of track 800 shown in FIG. 8 are accumulated into a single 3D graph. A cuboid is defined in 546 that fits tightly to the accumulated lidar data points. This cuboid can be defined in the same or similar manner of the tight-fit cuboid of 542. The cuboid of 546 is referred to herein as an accumulated-fit cuboid.

In 548, an amodal extent is computed or otherwise determined using the accumulated-fit cuboid and/or prior amodal extent(s) for the object. The amodal extent describes the minimum necessary volume to enclose the entire object of the truth, regardless of visibility. The amodal extent may be represented by scalar numbers of width, length and height. This computation or determination of the amodal extent can be achieved, for example, by: obtaining a prior amodal extent that has a maximum size for the object; obtaining another prior amodal extent that has a minimum size for the object; and comparing the size of the accumulated-fit cuboid to the maximum prior size and the minimum prior size. The amodal extent is set equal to the maximum prior size when the size of the accumulated-fit cuboid is greater than the maximum prior size, or alternatively set equal to the minimum prior size when the size of the accumulated-fit cuboid is less than the minimum prior size. Otherwise, the amodal extent is set equal to the extent of the accumulated-fit cuboid.

In 550, xyz coordinates for a center of the amodal cuboid is determined based on the tight-fit cuboid and/or loose-fit cuboids. For example, the center coordinates of the amodal cuboid are determined by: (i) aligning a corner of the amodal cuboid with the closest visible corner of the tight-fit cuboid; and (ii) aligning a corner of the amodal cuboid such that a boundary precision between the amodal cuboid and a loose-fit cuboid is maximized. Once aligned, the coordinates of the amodal cuboid's center are specified or otherwise obtained.

Subsequently, method 500 continues with 552 where the system performs operations of blocks 552-560 for each frame or 3D graph associated with the time period $T_1, \ldots, T_n$. In block 552, the system checks whether the object was previously classified as static or non-static for a particular frame or 3D graph associated with a time $T_1, \ldots,$ or $T_n$. If the object is classified as static [552:YES], then the system considers a centroid or center of the first loose-fit cuboid as the centroid or center for the amodal cuboid as shown by 554 and the following mathematical equation (11).

$$\text{Centroid}_{Amodal} = C_{CuboidTk} \qquad (11)$$

In contrast, if the object is classified as non-static [552: NO], then the system performs operations in 556 to identify a nearest point P* (of points $P_i$) to a point $P_{MP}$ on the mobile platform inside the first loose-fit cuboid. This operation may be defined by the following mathematical equation (12).

$$P^* = \arg\min_{i \in P} D(P_i, P_{MP}) \qquad (12)$$

where $D(P_i, P_{MP})$ is a real-valued distance function with domain P and arg mine $D(P_i, P_{MP})$ is a set of elements in P that achieve the global minimum in P. Point P* is then used in 558 as a corner point for the amodal cuboid, with the four possible corner choices being evaluated using a metric to compute an overlap between the amodal cuboid and the first loose-fit cuboid. The corner is selected with the highest score S. The score S may be a function of the area of the amodal cuboid $A_{amodal}$ and the area of the first loose-fit cuboid $A_{CuboidTk}$. The score S may be defined by the following mathematical equation (13).

$$S = (A_{amodal} \cap A_{CuboidTk})/A_{amodal} \qquad (13)$$

where the expression $A_{amodal} \cap A_{CuboidTk}$ represents an area of intersection of the amodal cuboid and the loose-fit cuboid. The selected corner is used in 560, along with a size and orientation of the amodal cuboid, to compute a center of the amodal cuboid $\text{Centroid}_{Amodal}$.

Figure 5C:
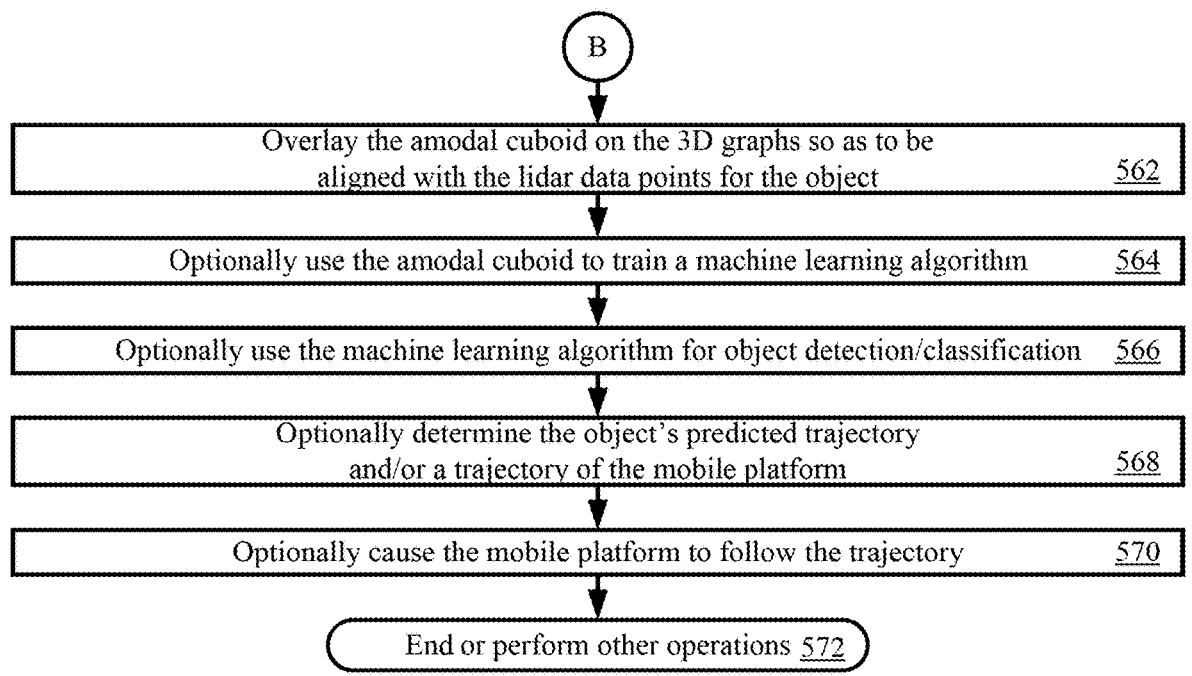

After completing the operations of 552-560, method 500 continues with 562 of FIG. 5C. The operations of block 562 involve overlaying the amodal cuboid on the 3D graphs so as to be aligned with the lidar data points for the object. Each amodal cuboid can be defined by a center (or centroid), an orientation, a width, a length and a height. The amodal cuboid may be overlaid on each 3D graph by, for example: (i) aligning a corner of the amodal cuboid with the closest visible corner of the tight-fit cuboid; and (ii) aligning a corner of the amodal cuboid such that a boundary precision between the amodal cuboid and a loose-fit cuboid is maximized. The term "boundary precision" refers to a computed intersection area between an area of the amodal cuboid and an area of a loose-fit cuboid divided by the total area of the amodal cuboid. In some scenarios, an additional extent margin on the amodal cuboid is provided. This is because after aligning the closest visible corner, part of the object might fall outside of the cuboid (part of the object might be actually closer to the lidar sensor than the closest corner of the tight-fit cuboid). So, a given margin (for example, 10-20 cm) may be added to the final amodal cuboid to accommodate this.

The amodal cuboid may optionally be used in 564 to train a machine learning algorithm for object detection/classification purposes, motion prediction purposes, and/or motion planning purposes (for example, to make predictions as to trajectories for objects). Methods for training machine learning algorithms using cuboids are known. The machine learning algorithm may be used in 566 for object detection and/or classification. The output from the machine learning algorithm may be used in 568 to determine the object's predicted trajectory and/or a trajectory of the mobile platform. The mobile platform may be controlled in 570 to cause it to follow the trajectory. Subsequently, 572 is performed where method 500 ends or other operations are performed (for example, return to 502 of FIG. 5A).

The above-described method 500 removes the jumpiness of amodal cuboids for static objects. This can improve a downstream ground truth generation for lidar based object detection algorithms as well as the velocity estimations for object tracking purposes.

Figure 9:
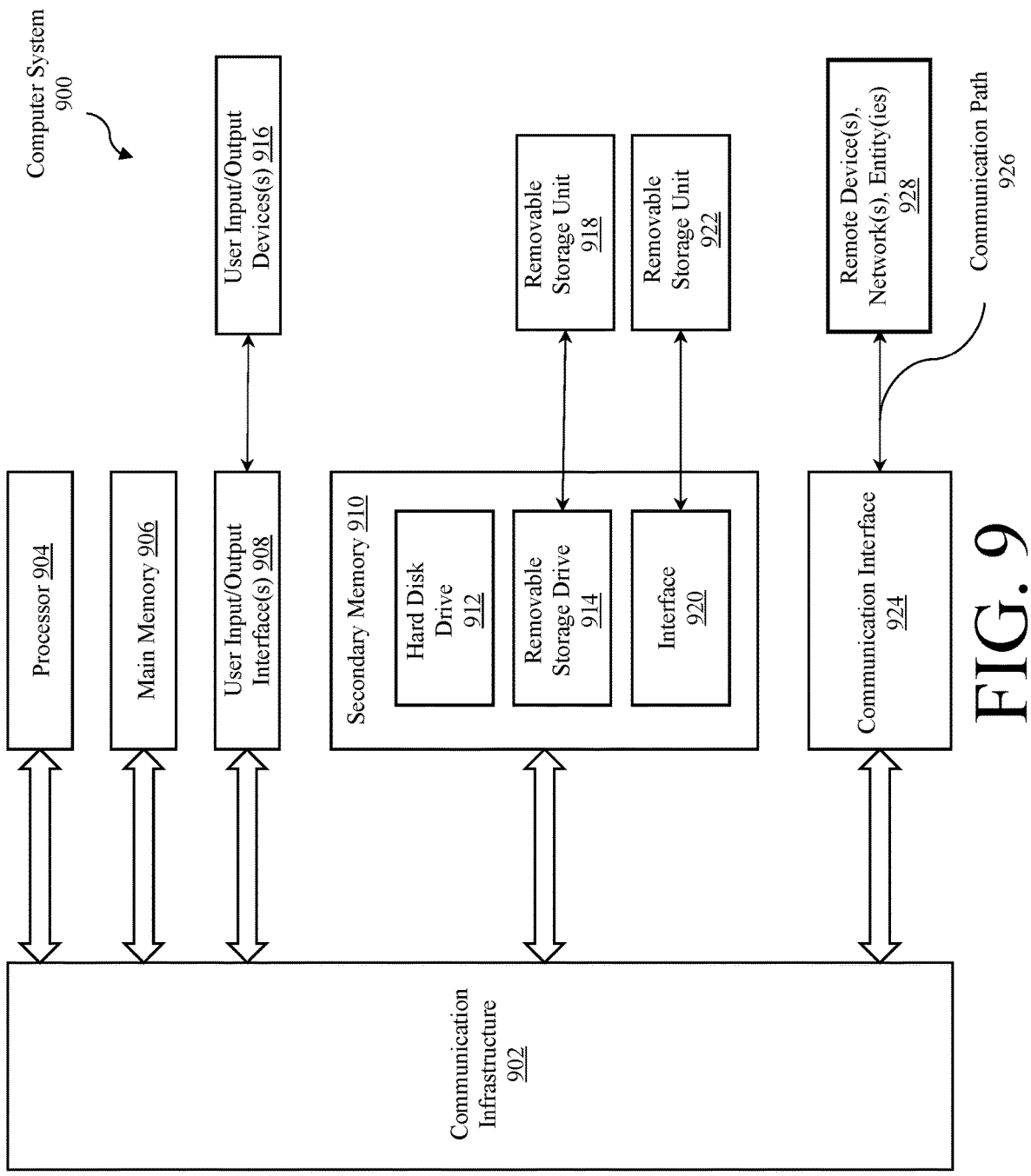
FIG. 9 provides an illustration of a computer system.

Various embodiments can be implemented, for example, using one or more computer systems, such as computer system 900 shown in FIG. 9. Computer system 900 can be any computer capable of performing the functions described in this document.

Computer system 900 includes one or more processors (also called central processing units, or CPUs), such as a processor 904. Processor 904 is connected to a communication infrastructure or bus 902. Optionally, one or more of the processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 916, such as monitors, keyboards, pointing devices, etc., that communicate with communication infrastructure 902 through user input/output interface(s) 908.

Computer system 900 also includes a main or primary memory 906, such as random access memory (RAM). Main memory 906 may include one or more levels of cache. Main memory 906 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 914 reads from and/or writes to removable storage unit 918 in a well-known manner.

According to an example embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 900, main memory 906, secondary memory 910, and removable storage units 918 and 922, as well as tangible articles of manufacture embodying any combination of the foregoing. Such control logic, when executed by one or more data processing devices (such as computer system 900), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices which may be components of a single device or components of separate devices, together or collectively perform a process.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for operating a lidar system. The system embodiments include a processor or computing device implementing the methods for operating a lidar. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of any of the methods described in this document.

What is claimed is:

1. A method for controlling a mobile platform, comprising:
   obtaining, by a computing device, loose-fit cuboids overlaid on 3D graphs so as to each encompass lidar data points associated with an object;
   checking, by the computing device, whether or not the object is static through a time period by performing a cuboid dimension check of the loose-fit cuboids;
   identifying, by the computing device, the lidar data points associated with the object inside the loose-fit cuboids and remove ground points;
   defining, by the computing device, a tight-fit cuboids by transferring the loose-fit cuboids from a first coordinate system into a second coordinate system;
   defining, by the computing device, an amodal cuboid based on the loose-fit cuboids and the tight-fit cuboids;
   identifying, by the computing device, a center for the amodal cuboid in response to the object being static; and
   causing, by the computing device, driving operations of the mobile platform to be controlled based on the amodal cuboid having the center which was identified.

2. The method according to claim 1, wherein the identifying comprises considering a center of one of said loose-fit cuboids as a center for the amodal cuboid when the object is static.

3. The method according to claim 1, wherein the checking further comprises performing at least one of a cuboid centroid check and a cuboid rotation check on the loose-fit cuboids.

4. The method according to claim 3, wherein the checking further comprises classifying the object as static in a time frame when the cuboid dimension check, the cuboid centroid check and the cuboid rotation check indicate that the object is associated with a same cuboid size, orientation and centroid at two consecutive times in the time period.

5. The method according to claim 3, wherein the cuboid dimension check comprises:
   obtaining dimensions for a first loose-fit cuboid in a first one of the 3D graphs plotting lidar data points of a first time frame;
   obtaining dimensions for a second loose-fit cuboid in a second one of the 3D graphs plotting lidar data points of a second time frame;

computing differences between dimensions of the first loose-fit cuboid and dimensions of the second loose-fit cuboid; and respectively comparing the differences to threshold dimension values.

6. The method according to claim 5, further comprising classifying the object as non-static in the second time frame when one or more of the differences are greater than the threshold dimension values.

7. The method according to claim 5, wherein the cuboid centroid check is performed when the differences are all less than the threshold dimension values.

8. The method according to claim 3, wherein the cuboid centroid check comprises:

obtaining a distance between a centroid of a first loose-fit cuboid of the loose-fit cuboids and a centroid of a second loose-fit cuboid of the loose-fit cuboids; and comparing the distance to a threshold distance value.

9. The method according to claim 8, further comprising classifying the object as non-static in a second time frame associated with the second loose-fit cuboid, when the distance is greater than the threshold distance value.

10. The method according to claim 8, wherein the cuboid rotation check is performed when the distance is less than the threshold distance value.

11. The method according to claim 3, wherein the cuboid rotation check comprises:

obtaining a difference between yaw values associated with first and second loose-fit cuboids of the loose-fit cuboids; and comparing the difference to a threshold yaw difference value.

12. The method according to claim 11, further comprising classifying the object as non-static in a second time frame associated with the second loose-fit cuboid, when the difference is greater than the threshold yaw difference value.

13. The method according to claim 1, wherein the defining the amodal cuboid includes:

aligning a corner of the amodal cuboid with a closest visible corner of the tight-fit cuboid; and aligning a corner of the amodal cuboid such that a boundary precision between the amodal cuboid and a loose-fit cuboid is maximized.

14. A system, comprising:

a processor;

a non-transitory computer-readable storage medium comprising programming instructions that are configured to cause the processor to implement a method for controlling a mobile platform, wherein the programming instructions comprise instructions to:

obtain loose-fit cuboids overlaid on 3D graphs so as to each encompass lidar data points associated with an object;

check whether or not the object is static through a time period by performing a cuboid centroid check on the loose-fit cuboids;

identify the lidar data points associated with the object inside the loose-fit cuboids and remove ground points;

defining a tight-fit cuboids by transferring the loose-fit cuboids from a first coordinate system into a second coordinate system;

defining an amodal cuboid based on the tight-fit cuboids;

identify a center for the amodal cuboid in response to the object being static; and cause driving operations of the mobile platform to be controlled based on the amodal cuboid having the center which was identified.

15. The system according to claim 14, wherein a center of one of the loose-fit cuboids is considered a center for the amodal cuboid when the object is static.

16. The system according to claim 14, wherein the check as to whether or not the object is static through the time period is achieved by further performing at least one of a cuboid dimension check, and a cuboid rotation check on the loose-fit cuboids.

17. The system according to claim 16, wherein the cuboid dimension check comprises:

obtaining dimensions for a first loose-fit cuboid in a first one of the 3D graphs plotting lidar data points of a first time frame;

obtaining dimensions for a second loose-fit cuboid in a second one of the 3D graphs plotting lidar data points of a second time frame;

computing differences between dimensions of the first loose-fit cuboid and dimensions of the second loose-fit cuboid; and respectively comparing the differences to threshold dimension values.

18. The system according to claim 16, wherein the cuboid centroid check comprises:

obtaining a distance between a centroid of a first loose-fit cuboid of the loose-fit cuboids and a centroid of a second loose-fit cuboid of the loose-fit cuboids; and comparing the distance to a threshold distance value.

19. The system according to claim 16, wherein the cuboid rotation check comprises:

obtaining a difference between yaw values associated with first and second loose-fit cuboids of the loose-fit cuboids; and comparing the difference to a threshold yaw difference value.

20. A non-transitory computer-readable medium that stores instructions that are configured to, when executed by at least one computing device, cause the at least one computing device to perform operations comprising:

obtaining loose-fit cuboids overlaid on 3D graphs so as to each encompass lidar data points associated with an object;

defining an amodal cuboid based on the loose-fit cuboids;

checking whether or not the object is static through a time period by performing a cuboid rotation check on the loose-fit cuboids;

identifying a center for the amodal cuboid based on said checking;

identifying the lidar data points associated with the object inside the loose-fit cuboids and remove ground points;

defining a tight-fit cuboids by transferring the loose-fit cuboids from a first coordinate system into a second coordinate system; and causing driving operations of a mobile platform to be controlled based on the amodal cuboid having the center which was identified.

* * * * *